(12) United States Patent
Yasuda

(10) Patent No.: US 7,136,766 B2
(45) Date of Patent: Nov. 14, 2006

(54) VEHICULAR ACCESSORY DIAGNOSTIC SYSTEM

(75) Inventor: Akio Yasuda, Kosai (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/001,049

(22) Filed: Dec. 2, 2004

(65) Prior Publication Data

US 2005/0143879 A1 Jun. 30, 2005

(30) Foreign Application Priority Data

Dec. 11, 2003 (JP) ............................. 2003-413634

(51) Int. Cl.
*G06F 19/00* (2006.01)
(52) U.S. Cl. ...................................................... 702/73
(58) Field of Classification Search .................. 702/73
See application file for complete search history.

(56) References Cited

U.S. PATENT DOCUMENTS

| | | | |
|---|---|---|---|
| 6,170,323 B1* | 1/2001 | Enomoto et al. | 73/118.1 |
| 6,357,288 B1* | 3/2002 | Shigihama et al. | 73/118.1 |
| 6,795,782 B1* | 9/2004 | Bertness et al. | 702/63 |
| 6,804,602 B1* | 10/2004 | Impson et al. | 701/117 |

FOREIGN PATENT DOCUMENTS

| | | |
|---|---|---|
| JP | A-3-202715 | 9/1991 |
| JP | A-10-10013 | 1/1998 |
| JP | A-2000-146765 | 5/2000 |
| JP | A-2002-301997 | 10/2002 |
| JP | A-2003-256033 | 9/2003 |

\* cited by examiner

*Primary Examiner*—Bryan Bui
*Assistant Examiner*—Jonathan Moffat
(74) *Attorney, Agent, or Firm*—Posz Law Group, PLC

(57) ABSTRACT

A control unit receives a sensor output and performs signal processing on the sensor output to produce an internal signal. The control unit produces internal data by adding time data to an internal signal and transmits the internal data to an in-vehicle network. A diagnostic unit receives the internal data from the in-vehicle network and stores the internal data in an internal data storing device. The diagnostic unit also receives a measurement signal produced based on the sensor output. The diagnostic unit produces external data by adding time data containing time at which the second timer resets a time count when an ignition switch is closed and stores the external data. The diagnostic unit reproduces the internal data and the external data and extracts the internal signal and the measurement signal. The diagnostic unit displays or stores the internal signal and the measurement signal according to the time data.

9 Claims, 6 Drawing Sheets

FIG. 3
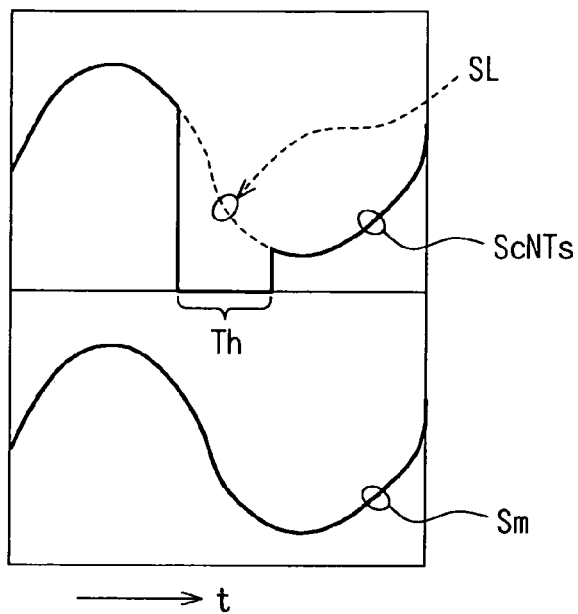
FIG. 4A
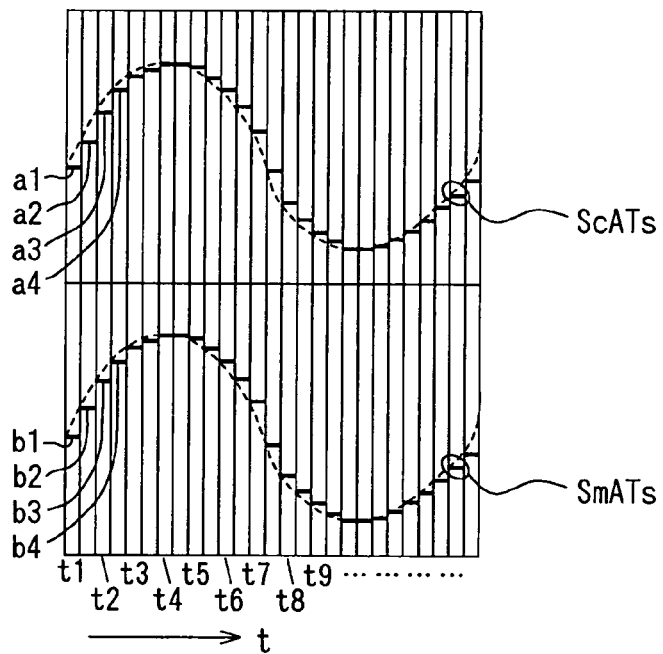
FIG. 4B
| t | t1 | t2 | t3 | t4 | t5 | t6 | · · · · |
|---|----|----|----|----|----|----|---------|
| ScATs | a1 | a2 | a3 | a4 | a5 | a6 | · · · · |
| SmATs | b1 | b2 | b3 | b4 | b5 | b6 | · · · · |

VEHICULAR ACCESSORY DIAGNOSTIC SYSTEM

CROSS REFERENCE TO RELATED APPLICATION

This application is based on and incorporates herein by reference Japanese Patent Application No. 2003-413634 filed on Dec. 11, 2003.

FIELD OF THE INVENTION

The present invention relates to a vehicular accessory diagnostic system.

BACKGROUND OF THE INVENTION

In a vehicular control unit, signals inside the control unit are used for diagnosing operation and functions of the control unit. However, such signals are difficult to take out of the control unit because the control unit is generally installed in a hard-to-reach location. Interior parts, surrounding devices, and brackets and stays that hold the control unit need to be removed to reach the control unit in many vehicles.

Furthermore, control signals or information signals are dramatically increased according to an increase in demand for improvements in vehicles in terms of intelligence and safety. As a result, harness assembly becomes complicated and a diameter of a bundle of the harnesses becomes large. The removal of the control unit requires a large number of man-hours due to the complicated harness assembly.

A diagnostic system or a development support system, such as a failure diagnosis device proposed in JP-A-2002-301997, is directly connected to an internal network of a vehicle. An additional signal line or harness is not required for transferring signals or data between the diagnostic system and the control unit.

Communication between the diagnostic system or the development support system, that is, an external system, and the control unit is often interrupted due to busy traffic in a communication line. Moreover, it may be interrupted due to transmission of signals or data related to driving control of the vehicle depending on priority or urgency. In such a condition, a difference between a sensor output received by the control unit and an actual sensor output is not precisely determined. Furthermore, internal communication cannot be examined in real time even when detailed investigation of operation and function of the control device is required.

SUMMARY OF THE INVENTION

The present invention therefore has an objective to provide a vehicular accessory diagnostic system that is able to investigate signals of the control unit for determining whether the control unit normally operates or functions. A vehicular accessory diagnostic system of the present invention includes a first control unit, a sensor, and a diagnostic unit. The first control unit, the sensor, and the diagnostic unit are connected to an in-vehicle network.

The control unit has data transmitting means for transmitting data produced by adding time data to an instantaneous value of a signal indicating its internal data, a sensor output, or an output of a second control unit. The diagnostic unit has transmitted data storing means and measurement data storing means. The transmitted data storing means receives and stores the transmitting data. The measurement data storing means stores measurement data. The measurement data is produced by adding time data to an instantaneous value of a signal indicating a sensor output or an output of the second control unit measured without using the network.

With the above configuration, the diagnostic unit can receive data related to the first control unit via the network. Namely, the diagnostic unit can receive and transmit data in predetermined cycles, such as packet transmission. Furthermore, the diagnostic unit can associate the transmitting data with the measurement data based on the time data included in each of the transmitting data and the measurement data. As a result, the operating condition or the functioning condition of the first control unit is properly determined.

BRIEF DESCRIPTION OF THE DRAWINGS

The above and other objectives, features and advantages of the present invention will become more apparent from the following detailed description made with reference to the accompanying drawings. In the drawings:

FIG. 3 is a graph showing waveforms of an internal signal of the control unit reproduced by an external diagnostic unit without a time stamp and a sensor output signal reproduced by the external diagnostic unit according to the embodiment;

FIG. 4A is a graph showing waveforms of an internal signal of the control unit reproduced by the external diagnostic unit with a time stamp and the sensor signal according to the embodiment;

FIG. 4B is a time table showing relationships between time data, internal data, and external data according to the embodiment;

DETAILED DESCRIPTION OF THE PREFERRED EMBODIMENT

The preferred embodiments of the present invention will be explained with reference to the accompanying drawings.

Figure 1:
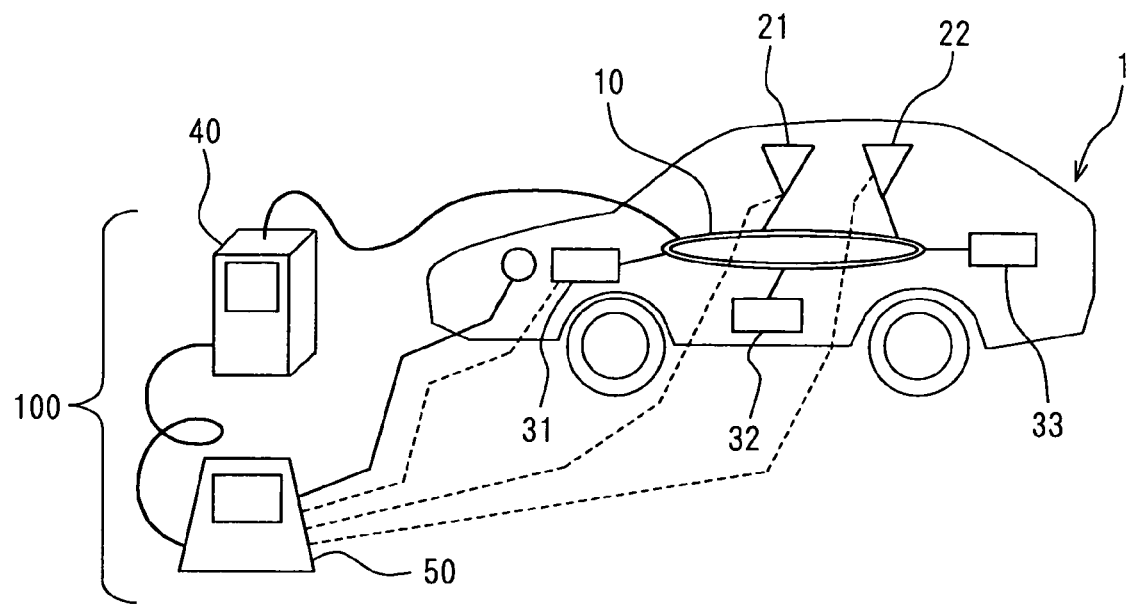
FIG. 1 is a schematic view of a vehicular accessory diagnostic system and a sample vehicle, an accessory of which is under diagnosis according to an embodiment of the present invention.

Referring to FIG. 1, a vehicular accessory diagnostic system 100 and an in-vehicle local-area network (LAN) 10 are connected to a sample vehicle 1 that is under test. The first and second sensors 21, 22, and electronic control units (ECUs) 31, 32, 33 are connected to the LAN 10. An external diagnostic unit 40 is also connected to the LAN 10 for receiving internal data of the ECU 31, which is transmitted from the ECU 31 to the LAN 10 by packet transmission. A measurement device 50 is connected to the diagnostic unit 40 for directly measuring sensor signals or control signals.

Figure 5:
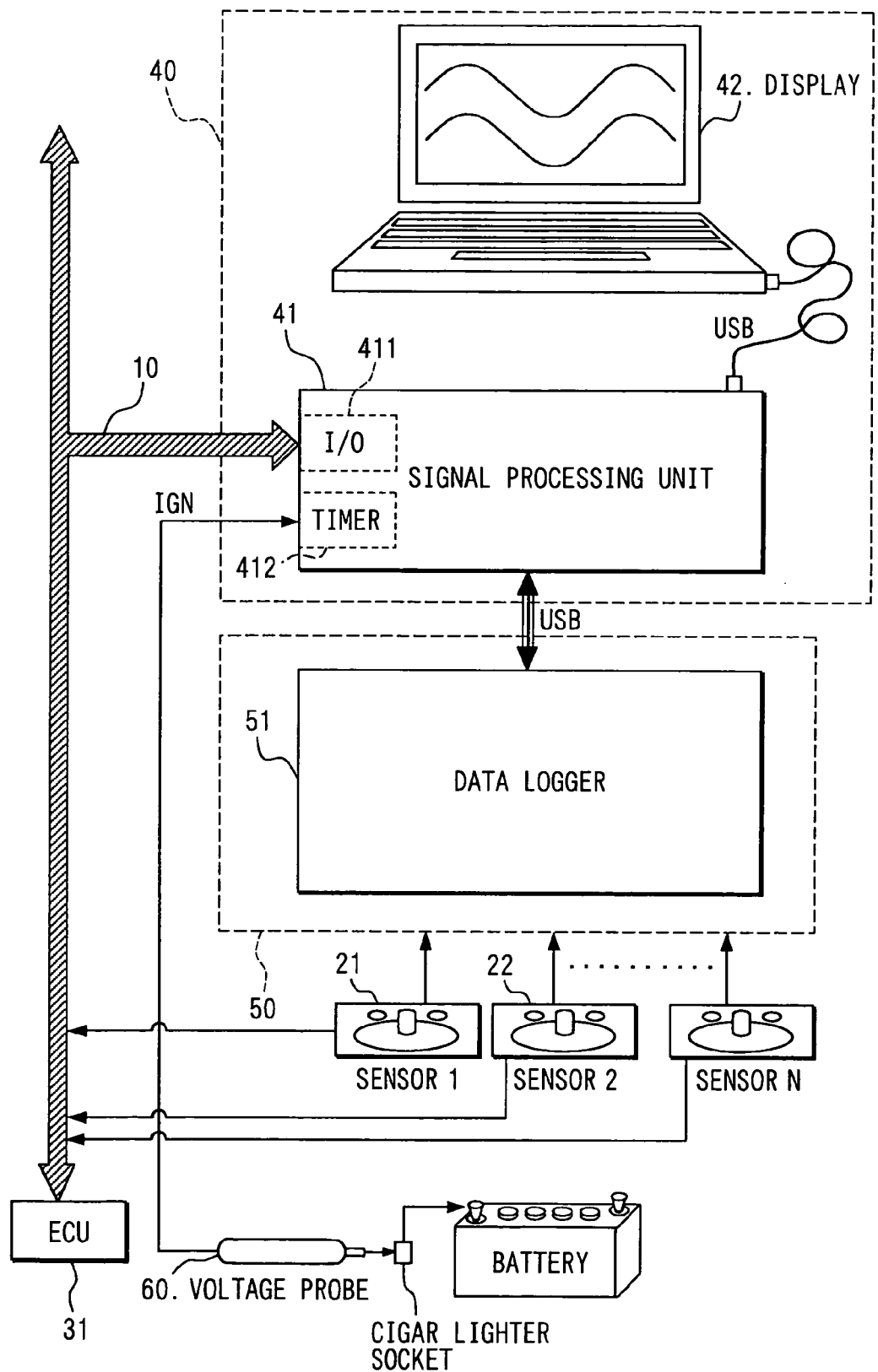
FIG. 5 is a block diagram of the diagnostic system according to the embodiment.
Figure 6:
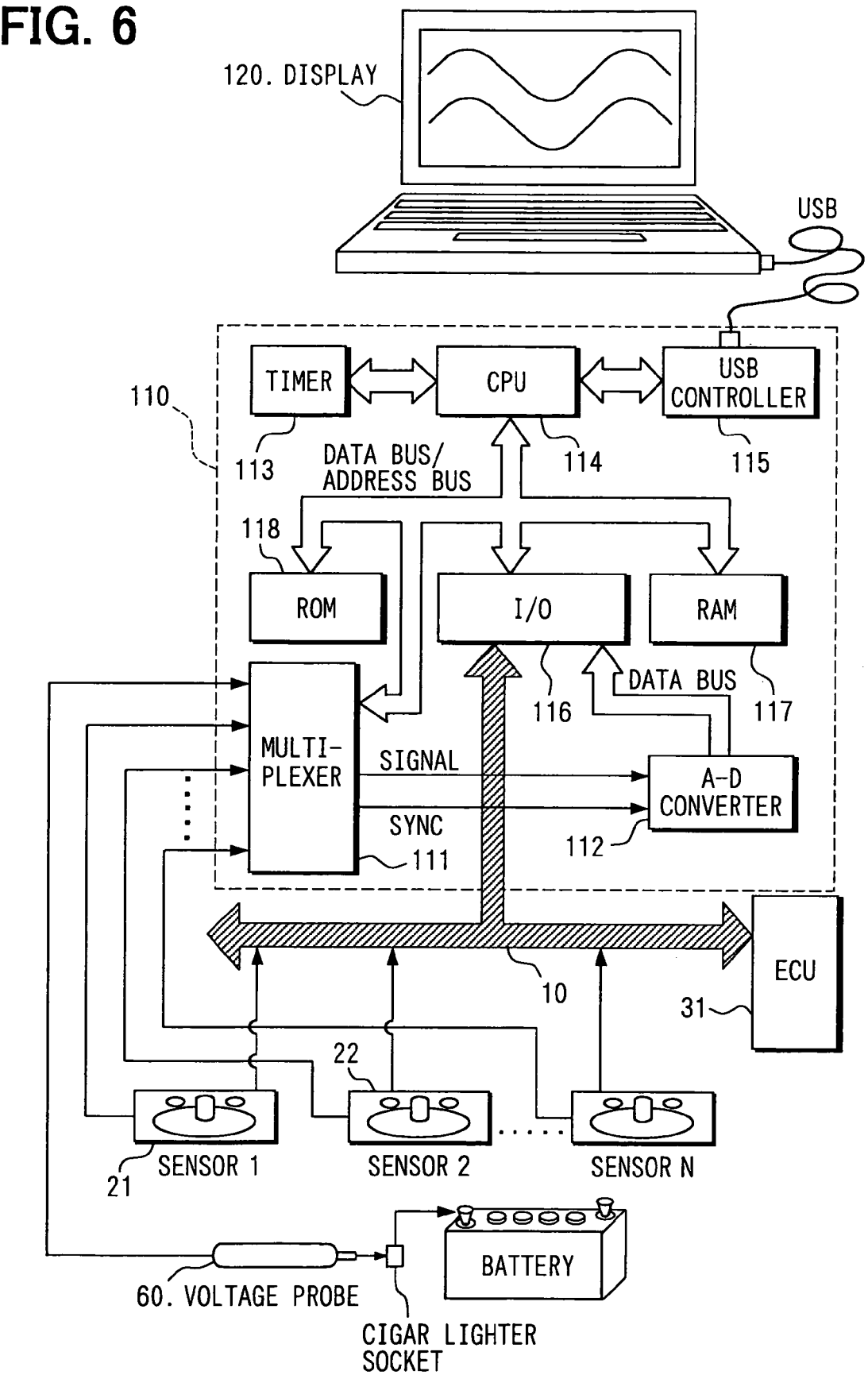
FIG. 6 is a block diagram of the diagnostic system including a microcomputer according to the embodiment.
Figure 7:
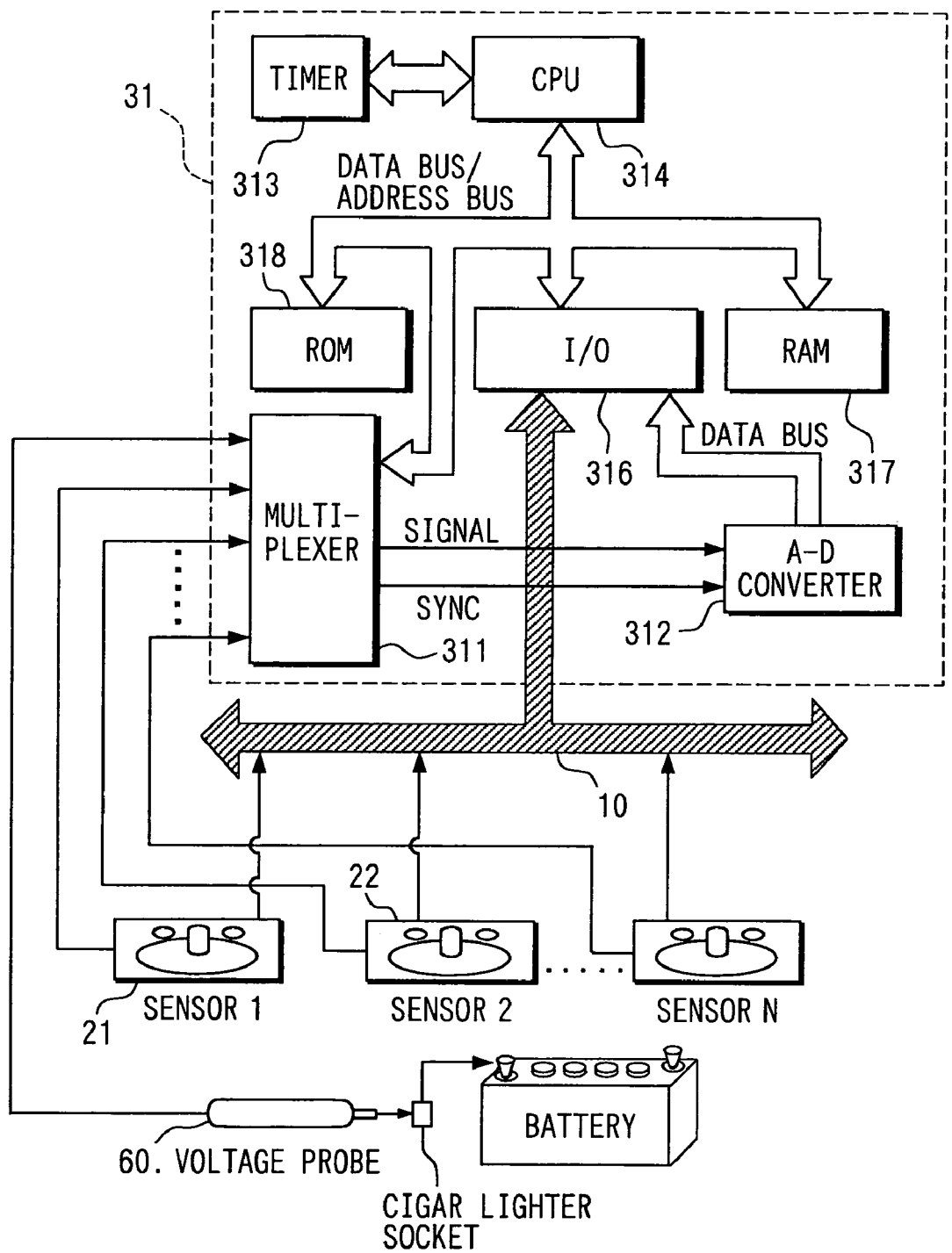
FIG. 7 is a block diagram of the control unit according to the embodiment.

A configuration of the diagnostic system 100 will be discussed referring to FIGS. 5 and 7. The diagnostic system 100 includes the LAN 10, the ECU 31, which is a subject unit under test, the diagnostic unit 40, the measuring device 50, and a voltage probe 60. The ECU 31 is connected to the LAN 10 for diagnosis. Controller area network (CAN), J1850, D2B, media oriented systems transport (MOST) can be used for the LAN 10. The measuring device 50 is connected to the diagnostic unit 40 for directly measuring a sensor output signal Ss.

The ECU 31 includes a multiplexer 311, an analog to digital (A/D) converter 312, a timer 313, a CPU 314, an input and output (I/O) circuit 316, a random access memory (RAM) 317, and a read only memory (ROM) 318. The timer 313 is an internal timer of the ECU 31 and the first timer (first time resetting device) of the diagnostic system 100. The ECU 31 receives a measurement instruction from the diagnosis system via the LAN 10. The instruction indicates a measurement start time, a sampling cycle, a measurement accuracy, and a measurement time. The ECU 31 takes in the sensor output signal Ss based on the instruction and produces an internal signal Sc by performing appropriate signal processing on the sensor output signal Ss. The signal processing includes noise reduction, signal level adjustment, and analog to digital conversion.

The ECU 31 produces the internal data ScATs by adding time data produced by the first timer 313 to the internal signal Sc, namely, by adding a time stamp to the internal signal Sc. Then, it forms a data block by adding a cyclic redundancy code (CRC) to the internal data ScATs for detecting an erroneous code. It adds a header including a flag sequence for frame synchronization and a destination address to the data block and sends the internal data ScATs to the LAN 10 by packet transmission.

The diagnostic unit 40 includes a signal processing unit 41 and a display 42. The signal processing unit 41 communicates with the ECU 31 via the LAN 10 and with a data logger 51 in the measuring device 50 via a universal serial bus (USB). The display 42 receives data from the signal processing unit 41 and displays it in a form of a table or a graph. The data includes the internal signal Sc and a measurement signal Sm that is produced by converting an instantaneous value of the sensor output signal Ss measured at every sampling cycle into digital data. The signal processing unit 41 controls the display of the data via the USB.

The signal processing unit 41 includes an input and output (I/O) circuit 411 and a timer 412, which is the second timer (second time resetting device) of the diagnostic system 100. The I/O circuit 411 has an I/O port to interface between the signal processing unit 41 and the LAN 10. The second timer 412 resets a time count when the battery voltage is inputted from the voltage probe 60 and a turning of an ignition switch is determined based on the battery voltage, and starts the time count from time 0.

The data logger 51 receives an analog signal outputted from the sensor 21, 22, that is, the sensor signal Ss and converts it into a digital data, that is, the measurement signal Sm. It records and reproduces the digital data. The voltage probe 60 is provided for measuring a battery line voltage $V_B$ of the vehicle 1 at a cigar lighter socket. By measuring the battery line voltage $V_B$ at the cigar light socket, a complicated device for synchronization between the ECU 31 and the diagnostic unit 40, such a highly stable reference signal generator is not required.

The signal processing circuit 41 receives the packet data and performs an error check on each piece of the packet data. Then, it stores and records the internal data ScATs included in the packet data. The data logger 51 reproduces the external data SmATs based on the measurement signal Sm and sends it to the signal processing circuit 41 via the USB. The signal processing circuit 41 stores and records the external data SmATs. It reproduces the internal signal Sc and the measurement signal Sm based on the time data (t1, t2, ..., tn, ...) included in the internal data ScATs and the external data SmATs. Then, it produces time-series signal data SDS that contains the internal data ScATs and the external data SmATs arranged in chronological order and sends the time-series signal data SDS to the display 42 via the USB.

The display 42 displays the time-series signal data SDS in graphs graphs shown in FIG. 4A or a time table shown in FIG. 4B. An examiner of the test visually inspects the time-series signal data SDS and determines whether the operation of the ECU 31 is normal. Alternatively, the signal processing circuit automatically analyzes a difference between the internal signal Sc and the measurement signal Sm and determines whether the operation of the ECU 31 is normal based on the result of the analysis.

Figure 2:
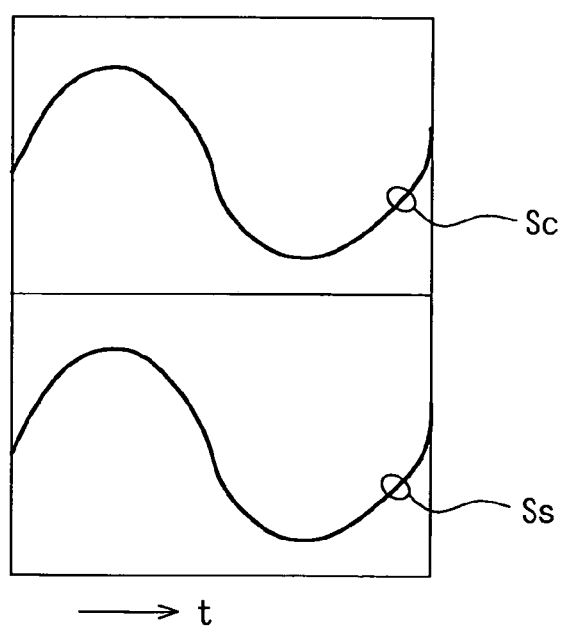
FIG. 2 is a graph showing waveforms of an internal signal and a sensor output signal processed by a control unit in the diagnostic system according to the embodiment.

The internal signal Sc and the sensor output signal Ss vary with time as shown in FIG. 2. The ECU 31 may not be able to continuously receive the sensor output signal Ss due to busy traffic in the LAN 10. In this case, the internal signal Sc does not continuously vary. As a result, the internal data ScNTs reproduced by the diagnostic unit 40 based on this internal signal Sc has a signal loss SL for a period Th as shown in FIG. 3. The operating condition of the ECU 31 cannot be properly determined based on a comparison between the internal data ScNTs and the measurement signal Sm because of this signal loss SL. Therefore, the ECU 31 adds a time stamp to the internal signal Sc so that the internal data ScATs is compared with the external data SmATs in connection with time.

The signal processing unit 41 and the data logger 51 can be configured with a microcomputer. A microcomputer 110 shown in FIG. 5 has a data logging function, a LAN interface function, a signal processing function, and display control function. It includes a multiplexer 111, an A/D converter 112, a timer 113, a CPU 114, a USB controller 115, an I/O circuit 116, a RAM 117, and a ROM 118. Sensor output signals Ss and the battery line voltage $V_B$ are inputted to the multiplexer 111. The signals Ss, $V_B$ are selected or multiplexed by the multiplexer 111 and inputted to the A/D converter 112. The selected or multiplexed signal is inputted to the I/O circuit 116 via a data bus.

The timer 113, which corresponds to the second timer, is reset based on turning of the ignition switch detected by a variation in the battery line voltage $V_B$. The timer 113 starts counting time from 0. The microcomputer 110 produces the external data SmATs by adding time data produced by the second timer 113 to the measurement signal Sm received at the I/O circuit when an instruction for starting the diagnosis is inputted by the examiner. The examiner can input the instruction through a touch panel or a keyboard of a display 120. Then, the microcomputer 110 stores and holds the external data SmATs in a memory A, which is a predetermined area in the RAM 117.

The microcomputer 110 receives the packet data from the ECU 31 and extracts the internal data ScATs. Then, it stores and holds the internal data ScATs in a memory B, which is a predetermined area in the RAM 117, in sequence. It reads the internal data ScATs and the external data SmATs out of the RAM 117 when the data preparation is completed. It produces the time-series signal data SDS by arranging pieces of data on the internal signal Sc and the measurement signal Sm in chronological order based on time count of the second timer. The time-series signal data SDS is sent to the display 120 via the USB controller 115 and displayed on the display 120 in a time table or graphs. Waveforms of the internal signal Sc and the measurement signal Sm that vary with time t are drawn in the graphs.

A structure and functions of the ECU 31 will be discussed referring to FIG. 7. An output of each sensor and the battery line voltage $V_B$ are selected or multiplexed by the multiplexer 311 and inputted to the A/D converter 312. Then, they are inputted to the I/O circuit 316 via the data bus. The first timer 313 is reset when the turn-on of the ignition switch is determined based on the variation in the battery line voltage $V_B$. The first timer 313 starts counting time from 0.

The ECU 31 produces the internal data ScATs by adding the measurement time counted by the first timer 313 to the sensor output Ss received by the I/O circuit 316. It temporarily stores the internal data ScATs in a predetermined area of the RAM 317. The ECU 31 sends a data block including the internal data ScATs, which is a data group, to the diagnostic unit 40 via packet transmission when the LAN 10 becomes available for data transmission. The availability of the data transmission of the LAN 10 is determined based on the amount of traffic in the LAN10. The data transmission is controlled according to priority determined based on communication traffic or a control condition of the vehicle.

The internal data ScATs reproduced and displayed by the diagnostic unit 40 is shown in FIG. 4A. Data for instantaneous values at time t1, t2, t3, . . . is indicated with numerals a1, a2, a3, . . . . The ECU 31 writes the internal data ScATs at the appropriate time and temporarily stores it when unable to send the internal data ScATs due to busy traffic in the LAN 10. The ECU 31 sends a data block containing a collection of the internal data ScATs stored during a period that the ECU 31 is unable to send the internal data ScATs when the LAN 10 becomes available for data transmission. For example, the ECU 31 stores the internal data ScATs when it cannot send the internal data ScATs at the sampling intervals until a predetermined time Th has elapsed since the last data transmission. Namely, the diagnostic unit 40 can obtain the internal data ScATs produced by the ECU 31 during the time Th. As a result, the diagnostic unit 40 can obtain complete data and display the internal data ScATs without a signal loss.

The external data SmATs is also displayed as shown in FIG. 4A. Data on instantaneous values at time t1, t2, t3, . . . is indicated with numerals b1, b2, b3, . . . . The diagnostic unit 40 compares the internal data ScATs with the external data SmATs and determines the operating condition of the ECU 31. Since the diagnostic unit 40 has the internal data ScATs without any signal losses, the comparison between the internal data ScATs and the external data SmATs is properly performed. As a result, the operating condition of the ECU 31 is accurately diagnosed.

The internal data ScATs and the external data SmATs are produced by converting the instantaneous values of the internal signal Sc and the measurement signal Sm into digital forms at every sampling time t1, t2, . . . . Therefore, waveforms produced when the internal data ScATs and the external data SmATs are decoded into analog signals in the diagnostic system take the form of staircase. However, smooth analog signals, such as the sensor output signal Ss shown in FIG. 2, can be reproduced by passing the digital signals through a low pass filter and removing high frequency components of a sampling frequency.

Figure 8:
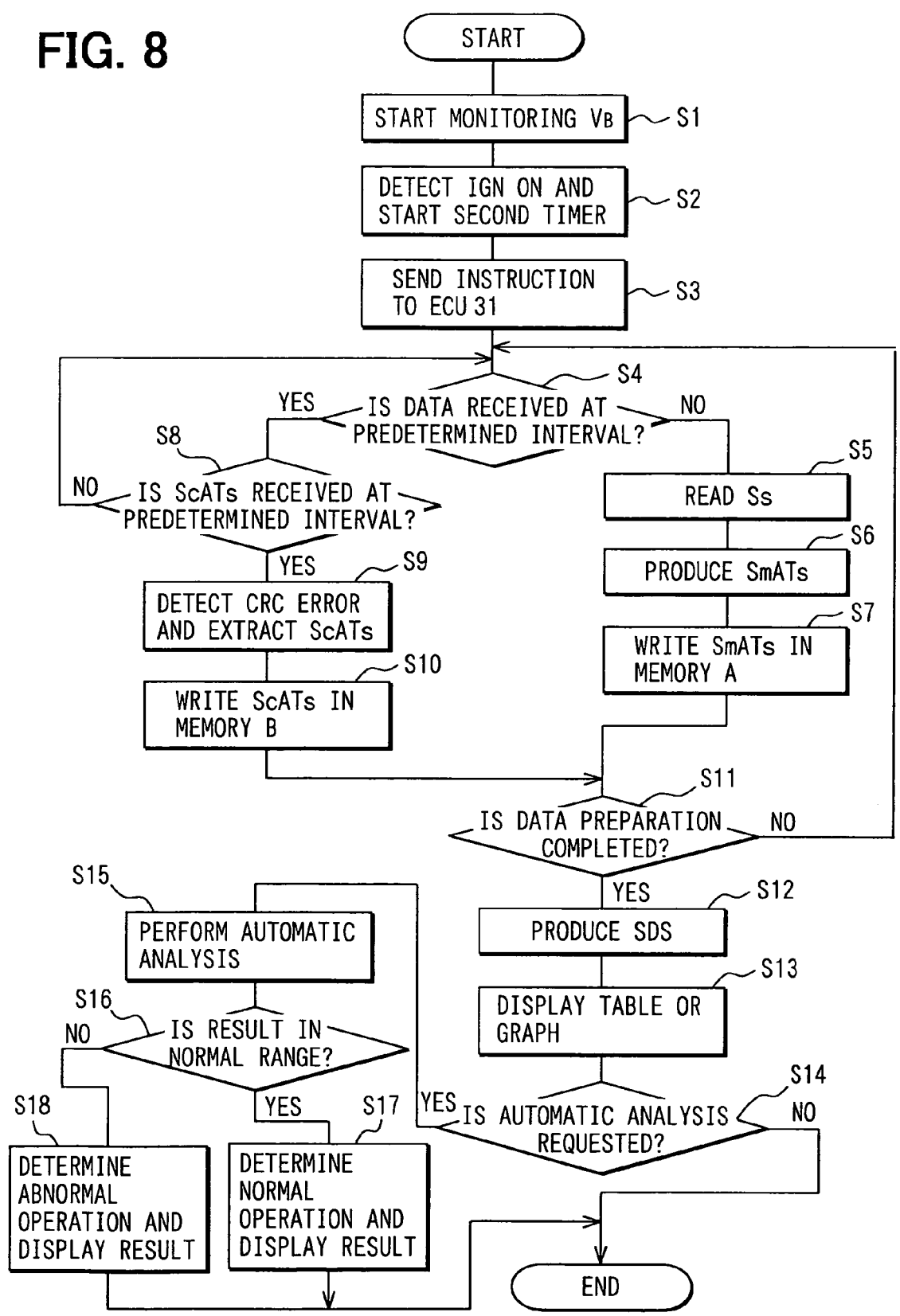
FIG. 8 is a flowchart of a program performed by the diagnostic system according to the embodiment.

A diagnostic program executed by the diagnostic system 100 for diagnosis of the ECU 31 will be discussed referring to a flowchart shown in FIG. 8. Monitoring of the battery line voltage $V_B$ is started (S1). Detection of a closure of the ignition switch is performed and time count of the second timer 113 is started (S2). An instruction indicating measurement condition is sent from the microcomputer 110 to the ECU 31 based on the instruction of the examiner (S3). It is determined whether an interval of receiving data via the LAN 10 is a predetermined interval (S4). If yes, it is determined whether the internal data ScATs sent from the ECU 31 via the LAN 10 is received at regular intervals (S8). If no, the process is returned to step S4. If yes, a CRC error is detected and the internal data ScATs is extracted (S9). The internal data is written into the memory B (S10).

If the interval of receiving data is not determined as the predetermined interval at step S4, the sensor output signal Ss is read (S5). The external data SmATs is produced by adding time data to the measurement signal Sm in every sampling cycle (S6). The external data SmATs is written in the memory A (S7). It is determined whether the data necessary for the diagnosis is prepared (S11) after step S10 or S7. If no, a routine of steps S4, and S8 through S10 or a routine of steps S4, and S5 through S7 is executed at regular intervals until data necessary for the diagnosis of the ECU 31 is prepared.

If the data preparation is completed, the time-series signal data SDS is produced (S12). More specifically, the internal data ScATs and the external data SmATs are read out of the memory A and the memory B, respectively. Pieces of the internal data ScATs and the external data SmATs are arranged in chronological order based on the time counts of the second timer 113. The time-series signal data SDS is sent to the display 120 and displayed in a table or graphs (S13). The examiner can determine the operating condition of the ECU 31 by visually comparing the internal data ScATs with the external data SmATs. However, an automatic diagnosis of the ECU 31 performed by the diagnostic system 100 will be discussed here.

It is determined whether an automatic analysis of the internal data ScATs and the external data SmATs is requested (S14). If no, the diagnostic process is completed. If yes, a difference between the internal data ScATs and the external data SmATs is analyzed (S15). For instance, the amount of the difference and a distribution of the frequencies at each time are analyzed. The operating condition of the ECU 31 is diagnosed based on a result of the analysis, including a distribution profile and a standard deviation and it is determined whether a result of the diagnosis is within a normal range (S16). If yes, the operating condition of the ECU 31 is determined as normal and the result indicating the normal operation is displayed (S17). If no, the operating condition of the ECU 31 is determined as abnormal and the result indicating the abnormal operation is displayed (S18). Then, the execution of the program is completed. A control program for executing the diagnostic program is stored in the ROM 118 and the execution of the diagnostic program is controlled based on instructions issued by the CPU114.

The first timer 313 and the second timer 412 are precisely synchronized. The ECU 31 is supplied with power via a harness. Therefore, a delay time between the closure of the ignition switch and the reset of the first timer 313 differs depending on electrical conditions or from system to system. To precisely synchronize the first timer 313 and the second timer 412, a delay time between a reference time of the closure of the ignition switch and a reset time of the first timer 313 is measured at a dozen or so microsecond order and stored in advance. The reset time is a time at which the first timer 313 becomes 0. A reset time of the second timer 412 is delayed from the reference time by the measured delay time. As a result, the second timer 412 is synchronized with the first timer 313 with an accuracy within a dozen or so microseconds.

Signal measurement is performed for 10 to 20 minutes after the closure of the ignition switch. Time is measured by the second timer 412 during the signal measurement since the standard time of the ignition switch closure. In the microcomputer 110, the second timer 113 is a quartz oscillator or an equivalent and its original oscillation frequency has stability of $10^{-8}$ (1/° C.). Thus, an error of the time counted by the second timer 412 with respect to the real time is maintained within one millisecond. Namely, a high accuracy is provided in the time measurement. The true time may be measured by an atomic clock.

With the above-described configuration, the internal signal Sc can be reproduced from the transmitted internal data ScATs in the form of a chronologically continuous signal. As a result, the reproduced internal signal Sc is displayed on the same time axis as the measurement signal Sm and the operating condition of the ECU 31 is properly diagnosed. The internal data ScATs and the measurement data SmATs are arranged in chronological order. Namely, the internal signal Sc produced by the ECU 31 can be reproduced with high quality without affected by noise or electromagnetic interference. Therefore, the operating condition of the ECU 31 is accurately diagnosed. Moreover, by measuring and stores the delay time in advance, the synchronization of the second timer 412 is synchronized with the first time 313 with a high accuracy without using an expensive device, such as oven-controlled crystal oscillator.

The present invention should not be limited to the embodiment previously discussed and shown in the figures, but may be implemented in various ways without departing from the spirit of the invention.

What is claimed is:

1. A vehicular accessory diagnostic system for diagnosis of an accessory device of a vehicle using an in-vehicle network, comprising:
   a control unit that controls operation of the accessory device;
   a sensor that generates an output for the diagnosis; and
   a diagnostic unit that diagnoses an operating condition of the control unit, wherein
   the control unit and the diagnostic unit are connected to the in-vehicle network,
   the control unit transmits data to the in-vehicle network,
   the diagnostic unit receives the data transmitted by the control unit via the in-vehicle network,
   the control unit has data transmitting means that transmits data to the diagnostic unit via the in-vehicle network, the data being produced by time-stamping first time data to any one of internal data, data of an instantaneous value of the sensor output, and data of an instantaneous value of an output of the control unit,
   the diagnostic unit has transmitted data storing means and measurement data storing means,
   the transmitted data storing means receives and stores the data transmitted by the data transmitting means of the control unit, and
   the measurement data storing means stores measurement data, the measurement data being produced by time-stamping second time data to data of an instantaneous value of any one of the sensor output, and the control unit output that is measured without using the in-vehicle network,
   the diagnostic unit has a signal processing unit that arranges a plurality of data transmitted by the data transmitting means and a plurality of measurement data in chronological order based on the first time data and the second time data, respectively, to form chronologically arranged data; and
   the signal processing unit displays or stores the chronologically arranged, wherein:
   the sensor is connected to the in-vehicle network,
   the control unit has a first time resetting means that resets the first time data at a first time when power is supplied and internal data transmitting means, which is the data transmitting means, transmits the internal data to the in-vehicle network,
   the diagnostic unit has a second time resetting means, internal data storing means, and external data storing means,
   the second time resetting means resets the second time data at a second time when an ignition switch of the vehicle is closed,
   the internal data storing means receives and stores the internal data on the in-vehicle network transmitted by the internal data transmitting means,
   the external data storing means produces external data by stamping the second time data to a signal indicating the sensor output or the control unit output and stores the produced external data,
   the signal processing means arranges the internal data stored by the internal data storing means in chronological order based on the first time data and displays or stores the chronologically arranged internal data, and
   the signal processing means arranges the external data stored by the external data storing means in chronological order based on the second time data and displays or stores the chronologically arranged external data.

2. The vehicular accessory diagnostic system according to claim 1, wherein the second time resetting means detects the closure of the ignition switch based on a voltage measured at a cigar lighter socket of the vehicle.

3. The vehicular accessory diagnostic system according to claim 1, wherein:
   the in-vehicle network controls data transmission of the control unit according to priority determined based on the communication traffic or a control condition of the vehicle;
   the control unit transmits a data group containing the internal data and an error detection code by packet transmission;
   the internal data storing means stores the internal data after error detection is performed for the internal data;
   the data processing unit arranges the internal data in chronological order according to the first time data or the second time data after measurement of the sensor output or the control unit;
   the data processing unit displays or stores the chronologically arranged internal data with a measurement data indicating the output of the sensor or the control unit.

4. The vehicular accessory diagnostic system according to claim 1, further comprising:
   delay time storing means that stores a delay time between the first time data and the second time data; and
   synchronizing means that synchronize the second time data to the first time data by using the delay time.

5. A vehicular accessory diagnostic system for diagnosis of an accessory device of a vehicle using an in-vehicle network, comprising:
   a control unit that controls operation of the accessory device;
   a sensor that generates an output for the diagnosis; and a diagnostic unit that diagnoses an operating condition of the control unit, wherein the control unit and the diagnostic unit are connected to the in-vehicle network, the control unit has data receiving and transmitting means, internal data preparing means, first time counting means, and transmitting data preparing means, the data receiving and transmitting means receives the sensor output and transmits transmitting data prepared by the transmitting data preparing means to the diagnostic unit, the internal data preparing means prepares internal data based on the sensor output, the first time counting means produces first time data, the transmitting data preparing means prepares the transmitting data by stamping the first time data to the internal data, the diagnostic unit has transmitted data storing means, second time counting means, measurement data preparing means, and measured data recording means, the transmitted data storing means stores the transmitting data, the second time counting means produces second time data, the measurement data preparing means prepares measurement data by measuring the sensor output and by stamping the second time data to the sensor output, the measurement data storing means stores the measurement data, the diagnostic unit further includes signal processing means, which arranges the transmitting data in chronological order based on the first time data for display or storage when more than one transmitting data are stored by the transmitted data storing means;

the sensor is connected to the in-vehicle network;

the first time counting means restarts counting time upon starting power supply to the control unit;

the first time data contains a first reset time at which the first time counting means restarts;

the data receiving and transmitting means transmits the internal data to the in-vehicle network;

the second time counting means restarts counting time upon a closure of an ignition switch of the vehicle;

the transmitted data storing means receives the internal data from the in-vehicle network and stores the internal data;

the second time data contains a second reset time at which the second time counting means restarts;

the signal processing means arranges the internal data stored by the transmitted data storing means in chronological order for display or storage based on the first time data; and the signal processing means arranges the external data stored by the measurement data recording means in chronological order for display or storage based on the second time data.

6. The vehicular accessory diagnostic system according to claim 5, wherein the second time counting means detects the closure of the ignition switch based on a voltage measured at a cigar lighter socket of the vehicle.

7. The vehicular accessory diagnostic system according to claim 5, wherein the internal data preparing means prepares the internal data by performing a signal processing on the sensor output and by stamping the first time data to the processed sensor output.

8. The vehicular accessory diagnostic system according to claim 5, further comprising:

delay time measuring means that measures a delay time between the first reset time and the second reset time; and reset time adjusting means that adjusts the second reset time based on the delay time to synchronize with the first reset time.

9. A vehicular accessory diagnostic system for diagnosis of an accessory device of a vehicle using an in-vehicle network that controls data transmission based on priority determined based on one of communication traffic and vehicle controlling condition, comprising:

a control unit that controls operation of the accessory device;

a sensor that generates an output for the diagnosis; and a diagnostic unit that diagnoses an operating condition of the control unit, wherein the control unit and the diagnostic unit are connected to the in-vehicle network, the control unit has data receiving and transmitting means, internal data preparing means, first time counting means, and transmitting data preparing means, the data receiving and transmitting means receives the sensor output and transmits transmitting data prepared by the transmitting data preparing means to the in-vehicle network by packet transmission, the internal data preparing means prepares the internal data based on the sensor output, the first time counting means produces first time data, the transmitting data preparing means prepares the transmitting data by stamping the first time data and an error detection code to the internal data, the diagnostic unit has error detecting means, transmitted data storing means, second time counting means, measurement data preparing means, signal processing means, and measured data storing means, the error detecting means determines whether an error is present in the internal data;

the transmitted data storing means stores the transmitting data, the second time counting means produces second time data, the measurement data preparing means prepares measurement data by measuring the sensor output and by stamping the second time data to the measured sensor output, the signal processing means arranges the transmitting data in chronological order based on the first time data for display or storage when more than one transmitting data are stored by the transmitted data storing means, and the signal processing means arranges the measurement data in chronological order based on the second time data for display or storage when more than one measurement data are stored by the measurement data storing means.

* * * * *